US012231855B1

(12) United States Patent
Kuipers et al.

(10) Patent No.: US 12,231,855 B1
(45) Date of Patent: Feb. 18, 2025

(54) PROTECTIVE ELEMENT FOR AN ELECTROACOUSTIC TRANSDUCER OF A HEARING DEVICE OR FOR A SOUND TUBE INCLUDED IN A HEARING DEVICE

(71) Applicant: SONOVA AG, Staefa (CH)

(72) Inventors: Erwin Kuipers, Wolfhausen (CH); Arno Römmeler, Zürich (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 18/910,219

(22) Filed: Oct. 9, 2024

Related U.S. Application Data

(63) Continuation of application No. 18/233,491, filed on Aug. 14, 2023.

(30) Foreign Application Priority Data

Aug. 22, 2022 (EP) .................................... 22191488

(51) Int. Cl.
*H04R 25/00* (2006.01)
*H04R 1/10* (2006.01)

(52) U.S. Cl.
CPC ......... *H04R 25/654* (2013.01); *H04R 1/1016* (2013.01); *H04R 25/652* (2013.01); *H04R 25/656* (2013.01); *H04R 2225/023* (2013.01); *H04R 2225/025* (2013.01); *H04R 2460/11* (2013.01)

(58) Field of Classification Search
CPC .. H04R 1/1016; H04R 25/652; H04R 25/654; H04R 25/656; H04R 2225/023; H04R 2225/025; H04R 2460/11
See application file for complete search history.

(56) References Cited

U.S. PATENT DOCUMENTS 4,953,215 A * 8/1990 Weiss .................. H04R 25/654 381/325
6,473,513 B1 10/2002 Shennib et al.
9,668,067 B2 5/2017 Hug et al.
9,774,962 B2 9/2017 Karamuk et al.
11,228,851 B2 1/2022 Dittli et al.
(Continued)

FOREIGN PATENT DOCUMENTS

EP 3142386 A2 3/2017

OTHER PUBLICATIONS

European Search Report and Written Opinion in European Application No. EP23218773.2.

*Primary Examiner* — Huyen D Le
(74) *Attorney, Agent, or Firm* — ALG Intellectual Property, LLC

(57) ABSTRACT

Described herein are a protective element configured to be connected to an electroacoustic transducer or a sound tube included in a hearing device, the protective element comprising a 3D-shaped membrane that has two or more first portions having a first thickness that are configured to transmit sound and two or more second portions having a second thickness. The first thickness is less than the second thickness such that a rigidity of the 3D-shaped membrane is greater at the two or more second portions than at the two or more first portions. At least two of the two or more second portions are spaced from one another along a circumference of the 3D-shaped membrane by at least one of the two or more first portions.

14 Claims, 12 Drawing Sheets

(56) References Cited

U.S. PATENT DOCUMENTS

| | | | | |
|---|---|---|---|---|
| 2006/0050914 | A1 | 3/2006 | Urso et al. | |
| 2010/0272299 | A1* | 10/2010 | Van Schuylenbergh | H04R 25/554 623/10 |
| 2017/0070832 | A1* | 3/2017 | Møller | H04R 25/652 |
| 2018/0367926 | A1 | 12/2018 | Marcher et al. | |
| 2021/0076145 | A1 | 3/2021 | Junke | |
| 2021/0258705 | A1 | 8/2021 | McIntosh et al. | |

* cited by examiner

PROTECTIVE ELEMENT FOR AN ELECTROACOUSTIC TRANSDUCER OF A HEARING DEVICE OR FOR A SOUND TUBE INCLUDED IN A HEARING DEVICE

RELATED APPLICATIONS

The present application is a continuation of U.S. patent application Ser. No. 18/233,491 filed Aug. 14, 2023, which claims priority to EP patent application Ser. No. 22191488.0, filed Aug. 22, 2022, each of which is hereby incorporated by reference in its entirety.

BACKGROUND INFORMATION

In hearing instruments, a notorious issue is that substances such as liquids, cerumen or dirt may enter a transducer, e.g. a receiver, or a receiver tube, which could lead to transducer malfunctioning and deterioration in hearing performance. This can range from slightly distorted acoustic signals to a total failure of the transducer. Transducer failure is the most frequent reason for servicing of hearing instruments.

Current solutions always try to keep out cerumen from the receiver, either by a more or less dense grid, or a membrane. Many different solutions are available, mostly in the form of so-called wax filters or cerumen filters. One can distinguish between acoustically open and acoustically closed filters. The open ones typically comprise a fine and dense mesh that blocks cerumen, for instance at the medial side in front of a receiver or at another side such as the lateral side, e.g., in front of a microphone. However, cerumen has a certain ability to stick to such a filter and cause partial or complete clogging of the filter. In case the level of clogging is too high, the hearing device wearer will perceive reduced and possibly distorted acoustic signals. When replacing such filters, the cerumen may be pushed further inside the transducer during the filter exchange process.

An example of an acoustically closed transducer protection system might be a flat membrane. However, the use of such a small flat membrane has the disadvantage that at large sound levels, the membrane displacement becomes a nonlinear function of the acoustic pressure, leading to nonlinearities in the reproduced sound (measurable as total harmonic distortion—THD) in the ear canal. Another disadvantage is, because the membrane needs to be very compliant, that the membrane can easily get damaged or punctured. Alleviation of this issue requires an increase of the membrane's bending stiffness (either by changing the material properties, or by thickening it) or its pre-tension. Both aspects will lead to a substantial sound transmission loss-leading to a lower fit-rate as, on average, larger receivers will be required to compensate for the induced acoustic loss.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Corresponding parts are marked with the same reference symbols in all figures.

DETAILED DESCRIPTION

Figure 1:
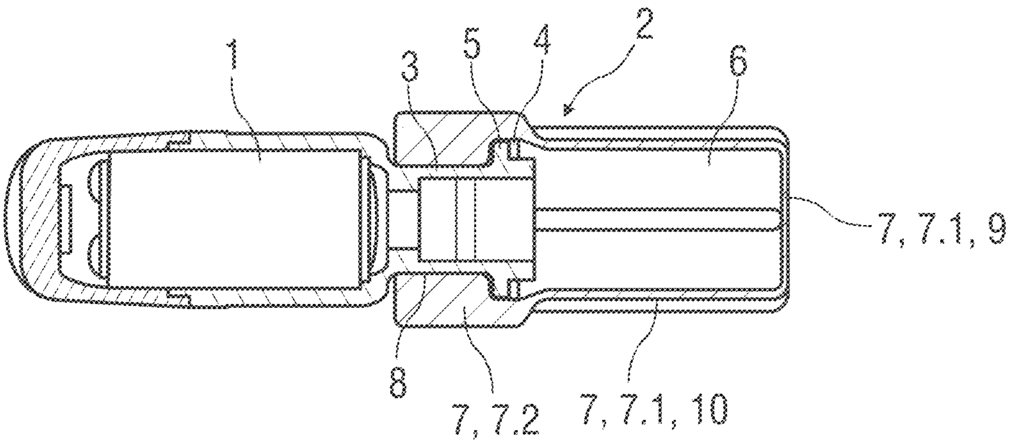
FIG. 1 is a schematic view of a transducer for a hearing device.

Described herein are a membrane for a receiver of a hearing device.

It is an feature of the present disclosure to provide a novel protective element.

In some examples, a protective element is provided, the protective element configured to be connected to an electroacoustic transducer or a sound tube included in a hearing device, the protective element comprising a 3D-shaped membrane enclosing a cavity with an opening at which the membrane is configured to connect to the transducer or sound tube, wherein the membrane has one or more thinner portions configured to transmit sound and one or more thicker portions at which a rigidity of the membrane is greater than at the thinner portions.

To illustrate, the electroacoustic transducer may be any transducer configured to convert electrical signals to sound, or vice versa. In an embodiment, the transducer is a loudspeaker, for instance a receiver. In an embodiment, the transducer is a microphone, for instance an ear canal microphone, or a microphone array.

In an embodiment, the thinner portions are predominantly configured to transmit sound, and the thicker portions are predominantly configured to provide for a mechanical stabilization of the membrane and/or an attachment of the membrane to the transducer or sound tube and/or portions configured to align with the ear canal. E.g., the attachment may be provided by at least one of the thicker portions positioned at the opening. E.g., the membrane may be configured such that an intensity of sound transmitted through the membrane is larger at the thinner portions as compared to the thicker portions.

The thinner portions may more easily be stimulated to vibrate during sound transmission, e.g., with a smaller mechanical damping and/or a larger vibration amplitude, as compared to the thicker portions due to a smaller mass and/or stiffness of the thinner portions.

Compared to flat membranes known in the art, a much larger surface can be realized by the 3D-shaped membrane, resulting in improved sound transmission. The required acoustic transmission performance may be achieved by the combination of several thinner portions, whereas the mechanical stability is provided by different, thicker portions. Further parts may be provided to prevent irritations of the ear canal skin in the case of contact and yet further parts (e.g. a dome) may be provided to ensure a good fit in the ear canal.

In an exemplary embodiment, the thinner portions have a thickness of less than 0.2 mm.

In an embodiment, one or more of the thinner portions comprise a region with a thickness of at most 0.1 mm, in particular at most 0.07 mm. In an embodiment, the thicker portions have a thickness exceeding a thickness of one or more of the thinner portions by at least 0.1 mm. In an embodiment, one or more of the thicker portions have a thickness of at least 0.3 mm.

In an embodiment, a thickness of the membrane progressively (e.g., continuously and/or gradually) decreases in one or more of the thicker portions toward one or more of the thinner portions. In an embodiment, the membrane comprises a thickness of 0.2 mm at a region at which one or more of the thicker portions lead toward one or more of the thinner portions.

In an embodiment, the membrane comprises at least two thinner portions which are angled relative to one another. In an embodiment, a direction in which one of the at least two thinner portions vibrates may thus be angled relative to a direction in which another one of the at least two thinner portions vibrates when sound is transmitted through the at least two thinner portions. To illustrate, a first virtual plane may be defined as a plane extending through a perimeter of one of the at least two thinner portions, and a second virtual plane may be defined as a plane extending through a perimeter of another one of the at least two thinner portions, wherein the first virtual plane and the second virtual plane are angled relative to one another. E.g., a normal vector of the first virtual plane may be angled relative to a normal vector of the second virtual plane. In an embodiment, an angle between at least two of the thinner portions is smaller than 180°. In an embodiment, an angle between at least two of the thinner portions is at most 150°.

In an embodiment, one or more of the thinner portions have a curved shape. In an embodiment, one or more of the thinner portions have a planar shape. E.g., when one or more of the thinner portions have a planar shape, a virtual plane extending through a perimeter of the respective thinner portion may correspond to a surface of the thinner portion. In an embodiment, one or more of the thicker portions are arranged between two or more of the thinner portions. In an embodiment, two or more of the thinner portions are adjoining each other. For example, two or more of the thinner portions may adjoin each other at an angle at which they are angled relative to one another, e.g., at a corner of the membrane. In an embodiment, one or more of the thicker portions protrude from at least two of the thinner portions at a region of the membrane at which the at least two thinner portions are angled relative to one another, e.g., at a corner of the membrane.

In an embodiment, the membrane comprises a front wall at a front end opposing a rear end at which the opening is provided, and a lateral wall extending between the front wall and the opening, wherein the lateral wall comprises at least one of the thicker portions.

In an embodiment, the lateral wall surrounds the cavity, e.g., along a circumference of the lateral wall. The lateral wall and/or the front wall may comprise an inner surface delimiting the cavity and an outer surface opposing the inner surface. The outer surface of the lateral wall may define a lateral area of the membrane. The outer surface of the front wall may define a bottom of the membrane. A central axis of the lateral wall may be defined as an axis extending through the cavity surrounded by the lateral wall between the opening, in particular a center of the opening, and the front wall, in particular a center of the front wall.

In an embodiment, the membrane is shaped similar to a cup, e.g., beaker-like, with a bottom provided at the front wall and a lateral area provided at the lateral wall. In an embodiment, the front wall is a thinner portion while the lateral wall near the opening is a thicker portion. In an embodiment, the lateral wall adjacent the front wall is also a thinner portion.

In an embodiment, the front wall is a thinner portion. In an embodiment, the front wall is planar. In an embodiment, the front wall is curved. In an embodiment, the front wall is curved toward the cavity.

In an embodiment, the lateral wall comprises one or more of the thinner portions. In an embodiment, one or more of the thinner portions of the lateral wall is planar. In an embodiment, one or more of the thinner portions of the lateral wall is curved. In an embodiment, one or more of the thinner portions of the lateral wall is curved away from the cavity, e.g., has a convex curvature. In an embodiment, one or more of the thinner portions of the lateral wall is curved toward the cavity, e.g., has a concave curvature.

In an embodiment, the lateral wall comprises a portion in which the lateral wall tapers toward the front end. In an embodiment, the lateral wall comprises a portion in which a cross section of the lateral wall remains substantially constant, in particular along a direction of extension in parallel to a central axis.

In an embodiment, an angle between one or more thinner portions of the front end and one or more thinner portions of the lateral wall is at least 90°. In an embodiment, an angle in between two or more thinner portions of the lateral wall is at most 150°. In an embodiment, an angle in between two or more thinner portions of the lateral wall is larger than 90°. In an embodiment, an angle in between two or more other thinner portions of the lateral wall is smaller than 90°.

In an embodiment, the one or more thinner portions at the lateral wall are predominantly configured to provide for a transmission of sound. For instance, an area of the membrane which is predominantly configured for sound transmission may be provided by one or more thinner portions at the lateral wall and/or by one or more thinner portions at the front wall. In particular, the predominantly sound transmissible area may be increased by one or more thinner portions at the front wall and at the lateral wall as compared to when the one or more thinner portions are solely provided at the front wall or at the lateral wall. In an embodiment, the thicker portions may also be configured for sound transmission, e.g., to a lesser extent than the thinner portions. A sound transmissible area of the membrane may thus be provided by one or more thinner portions and one or more thicker portions.

In an embodiment, the lateral wall comprises one or more of the thinner portions from which one or more of the thicker portions protrude at an outer surface and/or at an inner surface of the lateral wall. E.g., one or more of the thicker portions may protrude from the thinner portions at a corner region of the lateral wall at which the thinner portions are angled relative to one another and/or one or more of thicker portions may protrude from the thinner portions at a continuous region of the lateral wall at which the thinner portions are continuously joined.

In an embodiment, at least one of the thinner portions of the lateral wall has a different thickness as compared to the thickness of at least one of the thinner portions of the front wall. E.g., the front wall may be thinner than at least one of the thinner portions of the lateral wall. In an embodiment, at least one of the thinner portions of the lateral wall and at least one of the thinner portions of the front wall have an equal thickness.

In an embodiment, the one or more thinner portions of the lateral wall define a cylindrical outer surface of the lateral wall, e.g., by disregarding the one or more thicker portions of the lateral wall. In an embodiment, the one or more thinner portions of the lateral wall define a conical outer surface of the lateral wall.

In an embodiment, at least one of the thicker portions of the lateral wall leads to the opening.

In an embodiment, the thicker portion leading to the opening may be configured to provide for an attachment of the membrane to the transducer or sound tube. To illustrate, the rigidity of the membrane may be enhanced at the opening by the thicker portion leading to the opening such that a stable attachment can be achieved, e.g., without risking damaging of the membrane. In an embodiment, the thicker portion leading to the opening extends around a circumference of the lateral wall. In particular, when the thicker portion leading to the opening extends around a circumference of the lateral wall, a uniform stability of the attachment and/or a minimum risk of damaging the membrane may be realized.

In an embodiment, one or more stiffeners are formed by one or more of the thicker portions extending between the thinner portions on the outside and/or on the inside of the membrane.

To illustrate, by providing the one or more thicker portions such that each one extends between two or more of the thinner portions of the membrane, a stiffness of the membrane can be increased between the thinner portions due to the larger rigidity of thicker portion forming the stiffener in between. In this way, an overall stability of the membrane can be enhanced. In an embodiment, one or more of the stiffeners are rod-shaped. In an embodiment, one or more of the stiffeners are provided as fins. Fins may serve for reinforcement and/or for increasing the total sound radiating surface area and/or to obtain certain acoustic-mechanical vibration modes.

In an embodiment, one or more of the stiffeners are formed by one or more of the thicker portions of the lateral wall. To illustrate, one or more thicker portions at the lateral wall may constitute stiffeners, in particular to stabilize the lateral wall with regard to a lower stability of the one or more of the thinner portions at the lateral wall as compared to the thicker portions.

In an embodiment, one or more of the stiffeners are formed such that the membrane is configured to contact an ear canal wall at the stiffeners when connected to the electroacoustic transducer or sound tube, and when inserted into an ear canal. The stiffeners may thus provide a spacing of the one or more thinner portions at the lateral wall from the surrounding environment, e.g., the ear canal wall, in particular to ensure that vibrations of the thinner portions, e.g., during a sound transmission, are not hindered by the surrounding environment.

In an embodiment, the one or more thicker portions leading to the opening have a different thickness as compared to the thickness of the one or more thicker portions forming the stiffeners. E.g., the thicker portions leading to the opening may be thicker than at least one of the thicker portions forming the stiffeners. In an embodiment, the thicker portions leading to the opening and the thicker portions forming the stiffeners have an equal thickness.

In an embodiment, one or more of the stiffeners extend in parallel to a central axis of the lateral wall. In an embodiment, one or more of the stiffeners protrude from at least two of the thinner portions at a region of the lateral wall at which the at least two thinner portions are joined at an angle. E.g., the stiffeners may protrude from a corner region of the lateral wall. In an embodiment, one or more of the stiffeners are rod-shaped, in particular fins. In an embodiment, one or more of the stiffeners extend at least partially around a circumference of the lateral wall.

In an embodiment, at least two of the stiffeners are spaced from one another along a circumference of the lateral wall.

In an embodiment, a plurality of the stiffeners, e.g., at least three of the stiffeners, are distributed around the circumference of the lateral wall. In an embodiment, the stiffeners are equidistantly spaced from one another around the circumference of the lateral wall.

In an embodiment, the membrane has a star-like cross section due to a plurality of the stiffeners being arranged on the outside of the lateral wall.

In an embodiment, the membrane has a cross section approximating a polygon with edges joined at corners, wherein the corners are formed by at least part of the thicker portions, e.g., the stiffeners, and the edges comprise at least part of the thinner portions. E.g., the edges may be formed by at least part of the thinner portions and/or the edges may comprise at least one thicker portion in addition to one or more thinner portions. In an embodiment, the polygon is equilateral such that the edges have an equal length. In an embodiment, the polygon is equiangular such that the angles at the corners are equal. In an embodiment, the angles at two or more of the corners are different. E.g., an angle at one or more of the corners may be larger than 90°, and an angle at one or more other corners may be smaller than 90°. In an embodiment, one or more of the edges are curved. In an embodiment, one or more of the edges are planar.

In an embodiment, the membrane has a cross section approximating a rhombus with four corners formed by respective stiffeners. The cross section may be a four lobe cross section. In an embodiment, the diameter across two opposing ones of the corners is greater than the diameter across the two other opposing corners. In an embodiment, at least part of the edges between the corners are concave. In an embodiment, at least part of the edges between the corners are convex.

In an embodiment, the membrane is formed by injection molding.

In an embodiment, the membrane is formed by injection molding of liquid silicone rubber (LSR).

In an embodiment, one or more reinforcement parts made out of a different material than the membrane are arranged on the outside and/or on the inside of the membrane.

In an embodiment, one or more of the reinforcement parts extend between the thinner portions on the outside and/or on the inside of the membrane. To illustrate, by providing one or more of the reinforcement parts on the membrane such that they extend between two or more of the thinner portions of the membrane, a stiffness of the membrane can be increased between the thinner portions due to the larger rigidity provided by a support of the reinforcement parts. In this way, an overall stability of the membrane can be enhanced.

In an embodiment, the different material is a thermoplastic. In an embodiment, e.g., when the membrane is formed by injection molding, the one or more reinforcement parts may be applied by overmolding the different material on the membrane.

In an embodiment, one or more reinforcement parts are arranged on one or more of the stiffeners, e.g. in the shape of an additional rib on the fins. In an embodiment, a respective reinforcement part is arranged on two opposite ones of the stiffeners. In an embodiment, the one or more reinforcement parts may be provided by overmolding the different material on one or more of the stiffeners, e.g., by a thermoplastic overmolding.

In an embodiment, one or more of the reinforcement parts are arranged on the lateral wall, e.g., at the outer surface and/or at the inner surface of the lateral wall. In this way, the lateral wall may be stabilized with regard to a lower stability of the one or more of the thinner portions at the lateral wall as compared to the thicker portions.

In an embodiment, one or more of the reinforcement parts are formed such that the membrane is configured to contact an ear canal wall at the reinforcement parts when connected to the electroacoustic transducer or sound tube, and when inserted into an ear canal. The reinforcement parts may thus provide a spacing of the one or more thinner portions at the lateral wall from the surrounding environment, e.g., the ear canal wall.

In an embodiment, one or more of the reinforcement parts extend in parallel to a central axis of the lateral wall. In an embodiment, one or more of the reinforcement parts are rod-shaped, in particular in the shape of a rib. In an embodiment, one or more of the reinforcement parts extend at least partially around a circumference of the lateral wall.

In an embodiment, at least one reinforcement part made out of a different material than the membrane is arranged within the cavity to internally support the membrane.

In an embodiment, the reinforcement part is arranged within the cavity to internally support the membrane at a position of one or more of the stiffeners. In an embodiment, the reinforcement part is configured as a structure extending between two supported stiffeners. In an embodiment, the reinforcement part has a planar structure. In an embodiment, the reinforcement part has a rectangular shape. In an embodiment, the reinforcement part is provided with a cut out facing the front wall and/or a cut out facing the opening. E.g., the cut out may be a circular sector cut out.

In an embodiment, the membrane is made of a single material or multiple materials, e.g. silicone rubber and/or another polymer with Young's modulus less than 10 MPa, in particular less than 5 MPa, e.g., less than 3 MPa, and/or being provided with a coating repellent to cerumen.

In an embodiment, a length of the thinner portions of the lateral wall is at least 2 mm and/or at most 10 mm. In an embodiment, a diameter of the membrane, in particular of the front wall, is at most 7 mm. In an embodiment, a thickness of the thinner portions is 0.05 mm or below, at least for the thinnest parts.

In an exemplary embodiment, a perimeter of a front wall of the membrane has a rounded shape. To illustrate, the rounded shape of the perimeter of the front wall may facilitate an insertion of the protective element into an ear canal and/or ensure a good wearing comfort inside the ear canal, e.g., when the perimeter contacts the ear canal wall. In an embodiment, the rounded shape may be provided as a rounded structure arranged circumferentially around the perimeter.

In an embodiment, the thinner portions constitute a surface of the membrane of at least 30 $mm^2$.

In an embodiment, the thinner portions constitute a surface of the membrane, e.g. a portion of the outer surface of the membrane, of at least 40 $mm^2$, in particular at least 50 $mm^2$. In this way, a sound transmission through the protective element may be effectively increased, in particular by exploiting the 3D shape of the membrane.

In an exemplary embodiment, the membrane further comprises at least one dome configured for sealing against an ear canal, wherein the at least one dome is integrally formed with the membrane.

In an exemplary embodiment, the protection element comprises rounded edges between the thinner portions to avoid irritation or wearing comfort issues when a transducer element with the protection system is worn in the ear, wherein the radius of the rounded edges may be less than 0.5 mm but greater than 0.05 mm.

The protective element may be part of a hearing device comprising an electroacoustic transducer and/or a sound tube and the protective element as described above, wherein the membrane is connected to the electroacoustic transducer or sound tube.

In an embodiment, the sound tube is connected to the electroacoustic transducer. In an embodiment, the sound tube is disconnected from the electroacoustic transducer. E.g., the sound tube may be provided as a sound outlet in a housing of the hearing device, wherein the electroacoustic transducer is disposed inside the housing.

In an embodiment, the hearing device is configured to be worn at an ear of a user. In an embodiment, the hearing device is configured to be at least partially inserted into an ear canal of a user. E.g., the hearing device may include an earpiece configured for at least partial insertion into the ear canal. For example, the earpiece may comprise a shell customized to a shape of an individual ear canal of the user. As another example, the earpiece may comprise a flexible member, e.g., a dome, which can conform its shape to the shape of the individual ear canal. In an embodiment, the electroacoustic transducer and/or the sound tube is included in the earpiece. In an embodiment, the hearing device comprises a housing configured to be worn behind an ear of a user. In an embodiment, the electroacoustic transducer is included in the housing configured to be worn behind the ear.

In an embodiment, the membrane comprises one or more recesses arranged along an inner surface of the membrane, wherein the one or more recesses are configured to engage a corresponding number of protrusions on an outer surface of the electroacoustic transducer or the sound tube. E.g., the recess and the protrusion may be ring-shaped. E.g., the protrusion may extend around an outer circumference of the electroacoustic transducer or the sound tube. E.g., the recess may be arranged closed to the opening of the membrane.

In an embodiment, the hearing device comprises the protective element as described above, in particular the one having the at least one reinforcement part made out of a different material than the membrane arranged within the cavity to internally support the membrane, wherein the at least one reinforcement part comprises a portion of the electroacoustic transducer or the sound tube extending into the cavity. The protection element may be pulled over the portion extending into the cavity.

In an embodiment, one or more of the thicker portions protruding at an inner surface of the lateral wall, in particular at least one of the stiffeners, may contact an outer surface of the electroacoustic transducer or the sound tube constituting the reinforcement part. In this way, the one or more thinner portions of the lateral wall may be configured to vibrate during sound transmission without being blocked or damped by the outer surface of the electroacoustic transducer or the sound tube which is contacting the membrane at the one or more of the thicker portions.

In an embodiment, the protective element may be mounted to the transducer or sound tube by means of screwing and/or clamping.

This may allow for exchanging the protective element by the user.

In an embodiment, the Protection element may protrude inside the ear canal or stay hidden when applied inside an earpiece.

In an embodiment, the shape of the protection element may be such that the corners of the protection element protect the thinner portions to be in contact with the ear canal wall so that their vibration is not hindered.

In an embodiment, the protection element may be integrated with other earpieces, like custom shells.

In an embodiment, the protection element may be located fully inside a shell, instead of protruding into the ear canal.

In an embodiment, the transducer used with the protection element may be a microphone.

The protective element may be a 2K overmolded part, in particular having a hard core and a softer portion, wherein the core may serve for pressure equalization.

Further scope of applicability of the present embodiments will become apparent from the detailed description given hereinafter. However, it should be understood that the detailed description and specific examples, while indicating example embodiments, are given by way of illustration only, since various changes and modifications within the spirit and scope of the invention will become apparent to those skilled in the art from this detailed description.

FIG. 1 is a schematic view of a transducer 1 for a hearing device.

The present disclosure aims at providing sound transmission through a multi-purpose, 3D-shaped protective element 2 that is connected to an electroacoustic transducer 1, e.g. a receiver 1 or a microphone or a sound tube 3 which may be connected to the transducer 1 or which may be provided at a different position at or in the hearing device. This protective element 2 may have a hollow shape with a cavity 6 enclosed by one or more walls of a membrane 7, wherein the cavity 6 may be entirely enclosed but for an opening 8 configured to connect to the transducer 1 or sound tube 3, thus providing a thorough barrier against any substances or fluids that can be present in an ear canal of a user. In a first step, this may be implemented as a protection for the transducer 1.

In an exemplary embodiment, the protective element 2 can be mounted to the transducer 1, e.g., on a sound outlet port or sound tube 3 thereof. For instance, the mounting may be achieved by a recess 4, e.g. a circular recess 4, along an inner surface of the 3D-shaped protective element 2 which engages with a corresponding protrusion 5, e.g. a ring-shaped protrusion 5, on an outer circumference of the sound tube 3 of the transducer 1. In an exemplary embodiment, the transducer 1 or sound tube 3 may extend into the cavity 6, wherein a portion of the electroacoustic transducer 1 or the sound tube 3 extending into the cavity 6 may constitute a reinforcement part to internally support the membrane 7.

In an exemplary embodiment, the membrane 7 of the 3D-shaped protective element 2 may have a varying thickness, with thinner portions 7.1 being predominantly employed to transmit sound and thicker portions 7.2 predominantly providing a different functionality, e.g., stabilizing the structure and/or maintaining a desired shape of the 3D-shaped protective element 2, also during sound transmission. In particular, the thinner portions 7.1 may more easily be stimulated to vibrate during sound transmission, e.g., with a smaller mechanical damping and/or a larger vibration amplitude, as compared to the thicker portions 7.2 due to a smaller mass of the thinner portions 7.1.

Compared to flat membranes known in the art, a much larger surface can be realized by the 3D-shaped protective element 2, resulting in improved sound transmission. In an exemplary embodiment, the required acoustic transmission performance may be achieved by the combination of several thinner portions 7.1, whereas the mechanical stability is provided by different, thicker portions 7.2. Further parts may be provided to prevent irritations of the ear canal skin in the case of contact and yet further parts (e.g. a dome) may be provided to ensure a good fit in the ear canal.

An advantage of the present features is the possibility to adapt the geometry of the acoustically active elements of the protective element 2. The designers have the freedom to place an additional resonance in the acoustic chain, something that is desired to obtain improved acoustic signal output in a certain frequency band. The exact geometry may be optimized to match the required acoustic performance. If necessary, a mesh or a foam with open cells may be included in the inside, e.g. in the cavity 6, to enhance the performance.

In an exemplary embodiment, mechanical stability may be improved by stiffeners 7.3, e.g. fins 7.3, either on the outside or the inside of the protective element 2. A second component, e.g. a mechanical element inside the protection element, e.g. included by overmolding a thermoplastic component, can as well be added to meet the stability criteria. The transducer tube or sound tube 3 may also be prolonged, e.g. protrude into the cavity 6 and/or the protective element 2 may be mounted at a distance from the end of the sound tube 3, and used as an additional mechanical support. The outside of the protective element 2 may be designed without sharp edges that cause irritations when brought in contact with the skin of the ear canal, e.g., during insertion of an earpiece. E.g., the edges may have a shape such that corner regions of the membrane protect the thinner portions to be in contact with the ear canal wall so that their vibration is not hindered. E.g., the edges may be rounded edges.

This protective element 2 may be adapted for different ear canal geometries, e.g. small or large ear canals or circular and elliptical ones and may be combined together with a dome 13 into one single element. Therefore, the protective element 2 is an element that allows a mechanical coupling to the transducer 1 as it is implemented with prior art domes.

By choosing the material (e.g. silicone rubber) of the protective element 2 or applying a coating therein such that cerumen is unlikely to adhere to the surface, cleaning of the protective element 2 can be minimized. Nevertheless, it is much easier to clean a protruding protective element 2 with a smooth surface than a puncture-sensitive membrane. The material involved should be biocompatible because it is potentially in contact with the skin.

Improvements in the processing of liquid silicone rubbers in the recent years opened the possibility to create parts with membranes as thin as required for the present application, yet stable enough to sustain the mechanical loads.

The increased reliability of the protective element 2 may reduce the need for transducer servicing and less spare parts, e.g. wax filters, may be needed.

In an exemplary embodiment, the protective element 2 may be shaped similar to a cup or beaker, wherein the bottom or front wall 9 and the lateral wall 10 adjacent the front wall 9 of the cup are thinner portions 7.1 while the lateral wall 10 near the opening 8 are thicker portions 7.2. One or more stiffeners 7.3, e.g. fins 7.3, may be arranged along the lateral wall 10 and extend in parallel to a longitudinal axis L.

In an illustrative example, an effective length of the protective element 2, in particular the thinner portions 7.1 thereof, may be 2 mm to 10 mm, e.g. about 5.0 mm, its diameter may be 1 mm to 7 mm, e.g. about 4.0 mm and the wall thickness of the thinner portions 7.1 may be 0.05 mm or lower, e.g. 0.02 mm, for the thinnest parts.

The sound transmission of different transducers 1, e.g. a small transducer, a medium transducer and a large transducer equipped with the protective element 2 have been investigated by measuring the acoustic response in a 2 cc coupler when driven by a logarithmic sweep. For comparison, the same measurements with the small transducer, the medium transducer and the large transducer equipped with a conventional filter and a small vented dome have been conducted as well.

Figure 2:
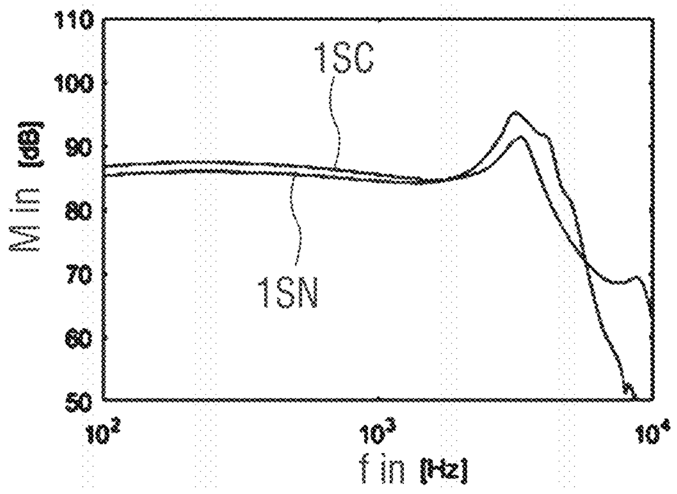
FIG. 2 is a schematic diagram of a magnitude of a sound transmission of a small transducer over the frequency.
Figure 3:
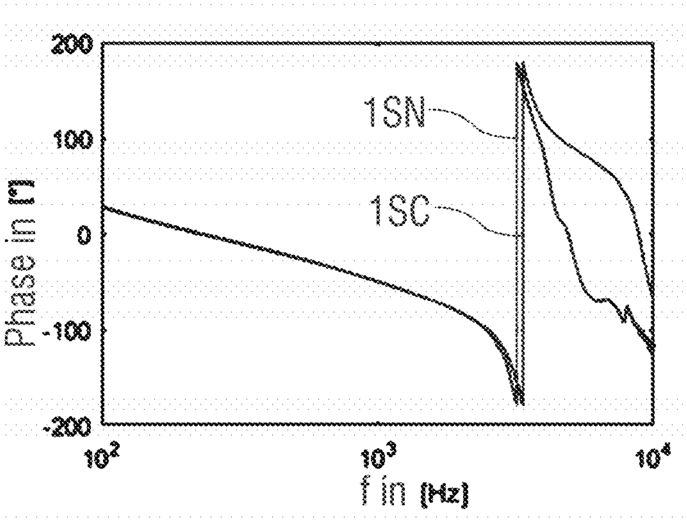
FIG. 3 is a schematic diagram of a phase of the sound transmission of the small transducer over the frequency.
Figure 4:
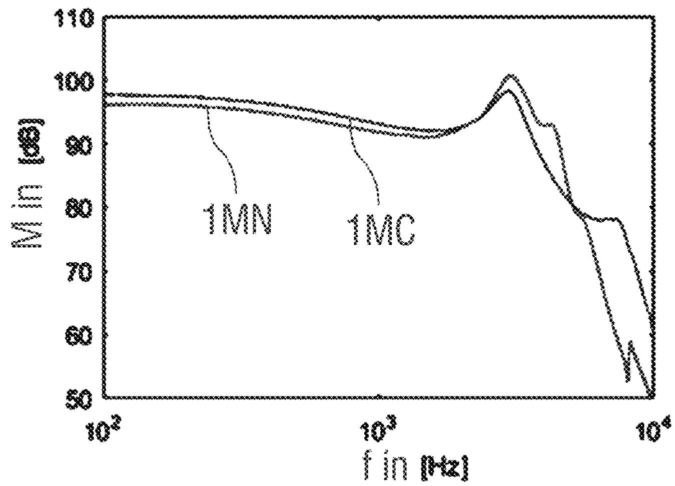
FIG. 4 is a schematic diagram of the magnitude of the sound transmission of a medium transducer over the frequency.
Figure 5:
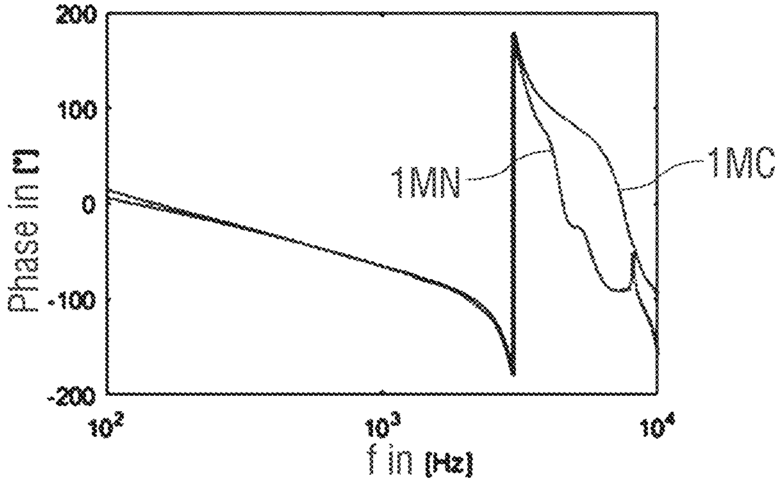
FIG. 5 is a schematic diagram of a phase of the sound transmission of the medium transducer over the frequency.
Figure 6:
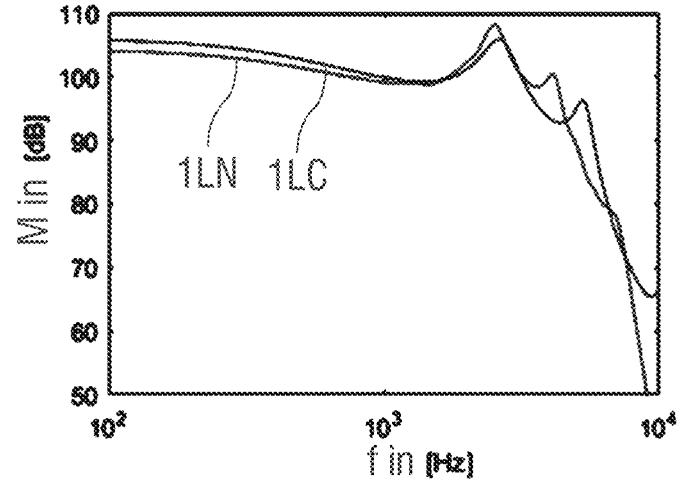
FIG. 6 is a schematic diagram of the magnitude of the sound transmission of a large transducer over the frequency.
Figure 7:
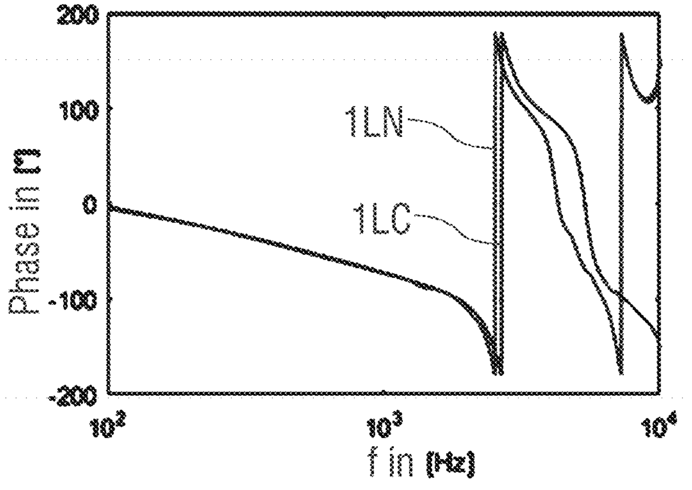
FIG. 7 is a schematic diagram of a phase of the sound transmission of the large transducer over the frequency.

The results of these measurements are shown in FIGS. 2 to 7. FIG. 2 is a schematic diagram of the magnitude M over the frequency f, wherein a curve 1SC relates to the small transducer equipped with a conventional filter and a curve 1SN relates to the small transducer equipped with the protective element 2. FIG. 3 is a schematic diagram of the phase P over the frequency f, wherein a curve 1SC relates to the small transducer equipped with a conventional filter and a curve 1SN relates to the small transducer equipped with the protective element 2. FIG. 4 is a schematic diagram of the magnitude M over the frequency f, wherein a curve 1MC relates to the medium transducer equipped with a conventional filter and a curve 1MN relates to the medium transducer equipped with the protective element 2. FIG. 5 is a schematic diagram of the phase P over the frequency f, wherein a curve 1MC relates to the medium transducer equipped with a conventional filter and a curve 1MN relates to the medium transducer equipped with the protective element 2. FIG. 6 is a schematic diagram of the magnitude M over the frequency f, wherein a curve 1LC relates to the large transducer equipped with a conventional filter and a curve 1LN relates to the large transducer equipped with the protective element 2. FIG. 7 is a schematic diagram of the phase P over the frequency f, wherein a curve 1LC relates to the large transducer equipped with a conventional filter and a curve 1LN relates to the large transducer equipped with the protective element 2.

The magnitude plot may be divided in three ranges, one for low frequencies below 1.7 kHz, one starting at 1.7 kHz up to 5.5 kHz and one for high frequencies above 5.5 kHz. In the low frequency region, the measurements show a loss of output of approximately 1.5 dB compared to the conventional filter. Above this frequency, the use of the protective element 2 results in a gain of output of up to 5 dB, followed by a loss of output in the high frequency range. The loss in the high frequency range gets more pronounced at higher frequencies. Due to the coupling of the transducer 1 to the small system volume, the first resonance (of the transducer 1) is shifted down slightly, and also the second resonance is shifted down significantly.

The loss of output (approximately 1.5 dB) in the low frequency range is dominated by the stiffness of the protective element 2. Decreasing the thickness of the protective element 2 further (e.g. to 0.08 mm) could reduce this loss. On the other hand, decreasing the thickness of the protective element 2 may compromise the manufacturing yield rate, especially the demolding process and robustness of the protective element 2 in general.

Between 1.7 kHz and 5.5 kHz (depending on the transducer 1 model), the protective element 2 yields a gain in output. In order to move the upper crossover frequency towards even higher frequencies, the second resonance frequency may be tuned by means of Finite Element Methods.

Above 5.5 kHz there is a severe loss of output (about 10 dB per decade). This effect is inherent to the system and cannot be avoided.

Figure 8:
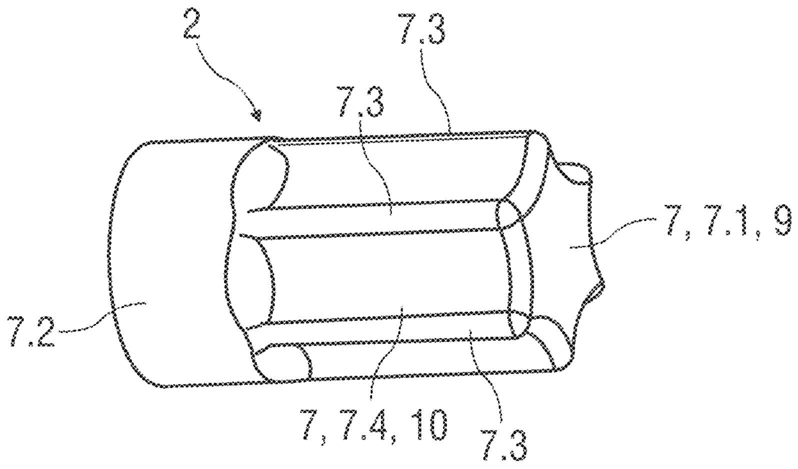
FIG. 8 is a schematic view of an exemplary embodiment of a membrane having a star-like cross section.

FIG. 8 is a schematic view of an exemplary embodiment of the protective element 2 having a cross section approximating a polygon with edges joined at corners, wherein the corners are formed by thicker portions 7.3 and the edges comprise thinner portions 7.4. The thicker portions 7.3 are stiffeners, in particular fins, spaced from one another along a circumference of the lateral wall 10. In particular, the cross section is a star-like cross section due to a plurality of fins 7.3, e.g. six fins 7.3, arranged on the outside of the thinner portion 7.1 adjacent the front wall 9 of the cup shape, wherein the fins 7.3 are uniformly distributed around the circumference of the cup shape. The resulting shape may be similar to a hexalobular external key (e.g. Torx™). The fins 7.3 improve mechanical stability while the thinner portions 7.1 between the fins 7.3 and the front wall 9 provide for the acoustic performance.

Figure 9:
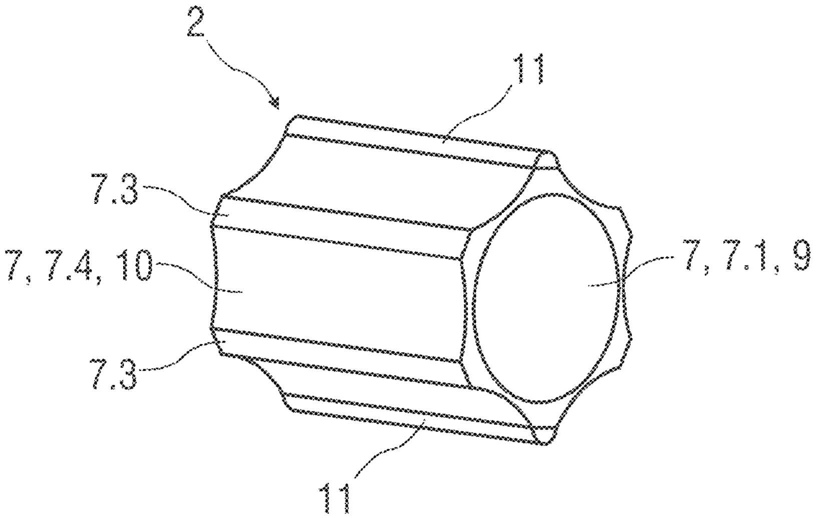
FIG. 9 is a schematic view of an exemplary embodiment of the membrane similar to the one of FIG. 8.

FIG. 9 is a schematic view of an exemplary embodiment of the protective element 2 similar to the one of FIG. 8. In the embodiment of FIG. 9, a respective reinforcement part 11 is arranged on two opposite ones of the fins 7.3 in the shape of an additional rib on the fins 7.3. The reinforcement part 11 is configured to provide mechanical stability without impact on the acoustic performance.

The reinforcement parts 11 on the outside of the protective element 2 can easily be added in a manufacturing process of the protective element 2, but they increase the overall size of the protective element 2.

Figure 10:
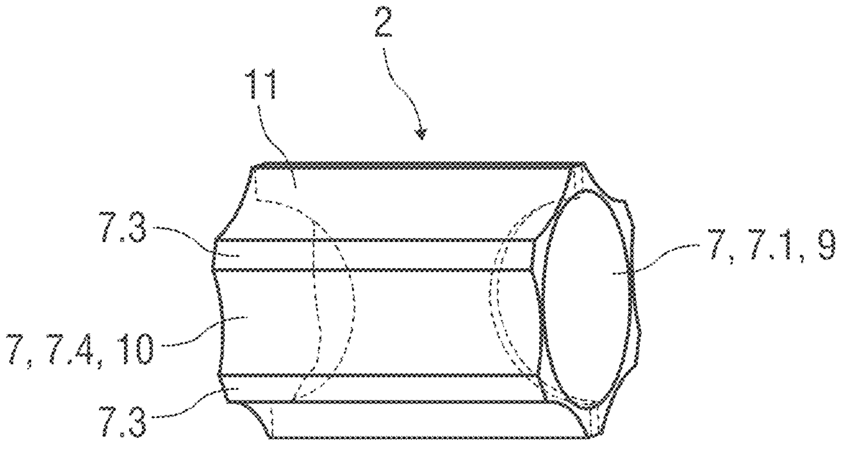
FIG. 10 is a schematic view of an exemplary embodiment of the membrane similar to the one of FIG. 8.

FIG. 10 is a schematic view of an exemplary embodiment of the protective element 2 similar to the one of FIG. 8. In the embodiment of FIG. 10, a reinforcement part 11 is arranged within the cavity 6 of the protective element 2 to internally support two opposite ones of the fins 7.3. The reinforcement part 11 may be configured as a planar structure extending between the two supported fins 7.3. In an exemplary embodiment, the planar structure of the reinforcement part 11 may be based on a rectangular shape with a cut-out, e.g. a circular sector, in particular a half circle, cut out respectively on two opposing sides, one facing the front wall 9 and the other facing the opening 8. The reinforcement part 11 is configured to provide mechanical stability without impact on the acoustic performance. The cut-out serves for providing the same acoustic pressure everywhere in the cavity 6. The cut-out does not necessarily have to be circular.

The reinforcement part 11 on the inside supports mainly along one dimension, but elements providing support in more directions are possible as well. The reinforcement part 11 may be made out of a different material than the protective element 2 and inserted in a separate step. In an exemplary embodiment, the transducer 1 or sound tube 3 may extend into the cavity 6, wherein a portion of the electroacoustic transducer 1 or the sound tube 3 extending into the cavity 6 may constitute the reinforcement part 11 to internally support the membrane 7.

Figure 11:
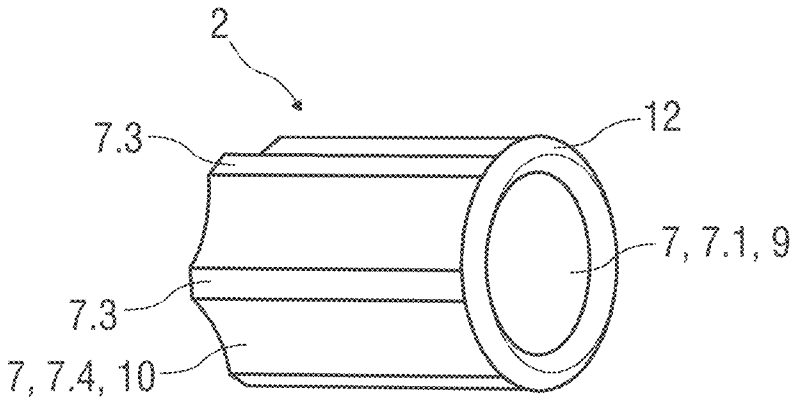
FIG. 11 is a schematic view of an exemplary embodiment of the membrane similar to the one of FIG. 8.

FIG. 11 is a schematic view of an exemplary embodiment of the protective element 2 similar to the one of FIG. 8. In FIG. 11, a frontside of the protective element 2 may be provided with a rounded structure 12 to prevent irritations in case of contact with the ear canal skin. The rounded structure 12 may be arranged circumferentially around a perimeter of the front wall 9.

Figure 12:
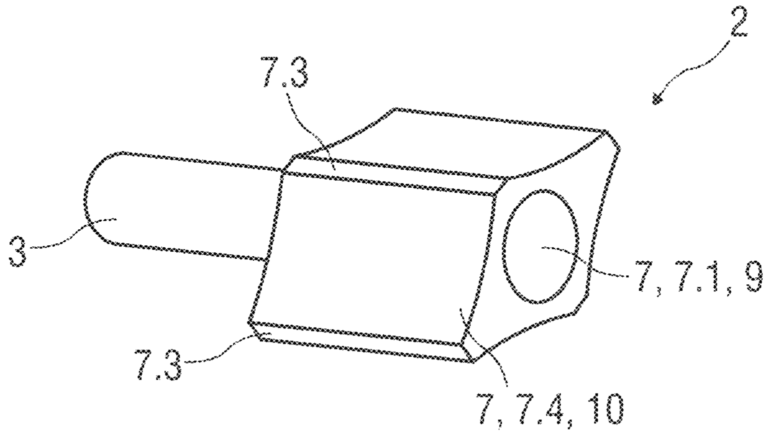
FIG. 12 is a schematic view of an exemplary embodiment of the membrane having an alternative shape.

FIG. 12 is a schematic view of an exemplary embodiment of the protective element 2 having an alternative shape with a cross section of membrane 7 approximating a polygon with corners formed by thicker portions 7.3 and edges comprising thinner portions 7.4.

Instead of the circular cross section of the cup shape, the protective element 2 of FIG. 12 has a four lobe cross section approximating a rhombus, wherein the diameter across two of the opposing corners is greater than the diameter across the two other opposing corners. The edges between the corners may be slightly concave.

As in the cup-shaped protective element 2, the front wall 9 or front surface and the lateral wall 10 adjacent the front wall 9 are thinner portions 7.1. One or more stiffeners 7.3, e.g. fins 7.3, may be arranged along the lateral wall 10 and extend in parallel to a longitudinal axis L. In particular, the fins 7.3 form the corners of the four lobe cross section.

Figure 13:
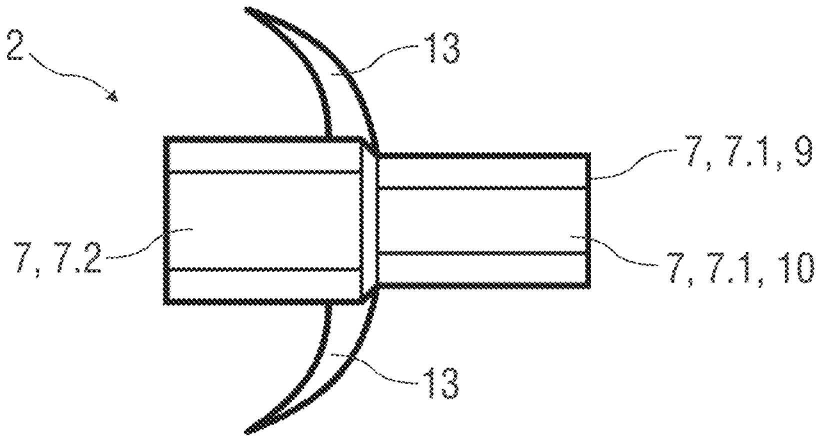
FIG. 13 is a schematic view of an exemplary embodiment of the membrane similar to the one of FIG. 8 with an additional dome.

FIG. 13 is a schematic view of an exemplary embodiment of the protective element 2, e.g. similar to the one of FIG. 8 with an additional dome 13, e.g. for sealing against the ear canal of the user. This may be particularly useful for RIC (receiver in the canal) type hearing aids. The dome 13 may be integrally formed with the protective element 2. The dome 13 may be attached to the protective element 2 at the thicker portion 7.2 of the lateral wall 10 near the opening 8, in particular adjacent the thinner portion 7.1 of the lateral wall 10.

Figure 14:
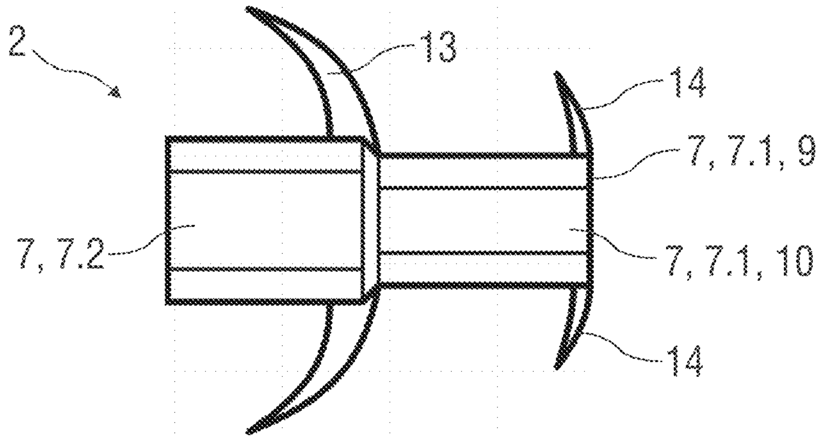
FIG. 14 is a schematic view of an exemplary embodiment of the membrane similar to the one of FIG. 13 with yet another dome.

FIG. 14 is a schematic view of an exemplary embodiment of the protective element 2, e.g. similar to the one of FIG. 13. In addition to the dome 13 of FIG. 13, a further dome 14 is arranged on the protective element 2, e.g. at the frontside of the protective element 2. The further dome 14 should be an open one to maintain the desired functionality. An open dome is a dome with a relatively large acoustically open cross-section. I.e. a large amount of direct sound enters the residual ear canal. In particular, the further dome 14 may be provided with one or more venting channels.

Figure 15:
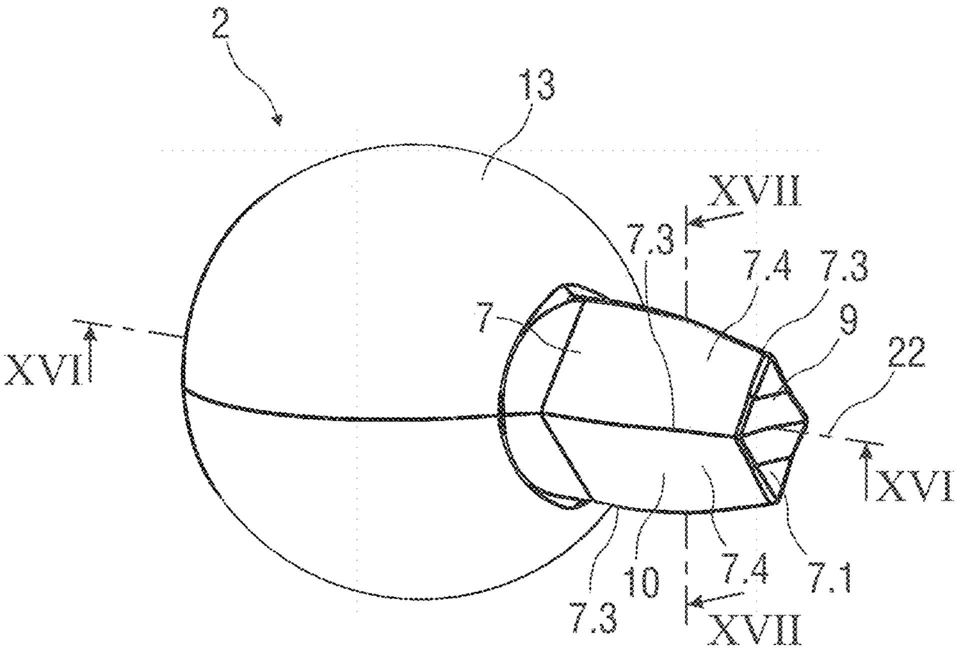
FIG. 15 is a schematic perspective view of another exemplary embodiment of the protective element.
Figure 16:
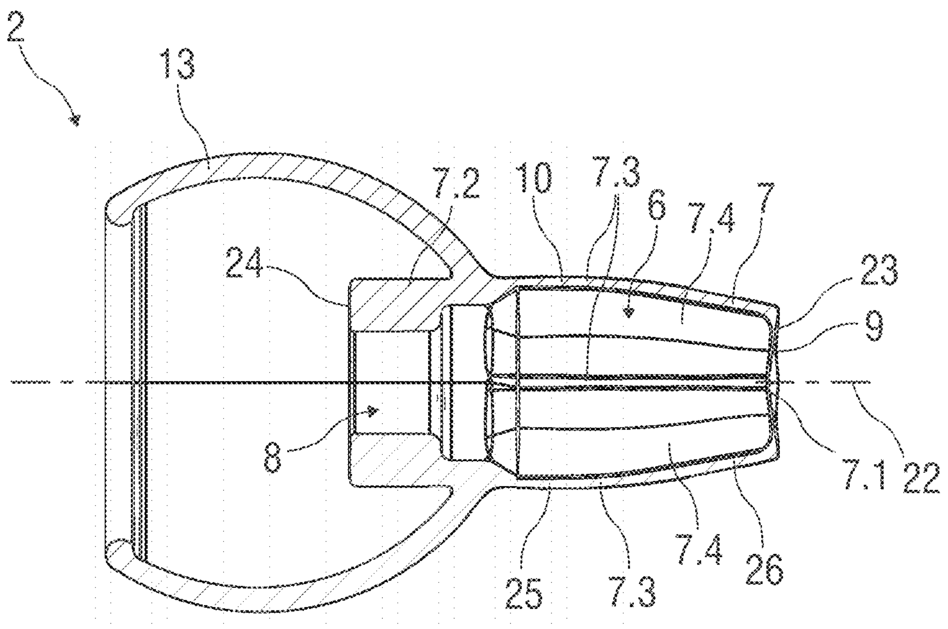
FIG. 16 is a schematic longitudinal section of the protective element of FIG. 15.
Figure 17:
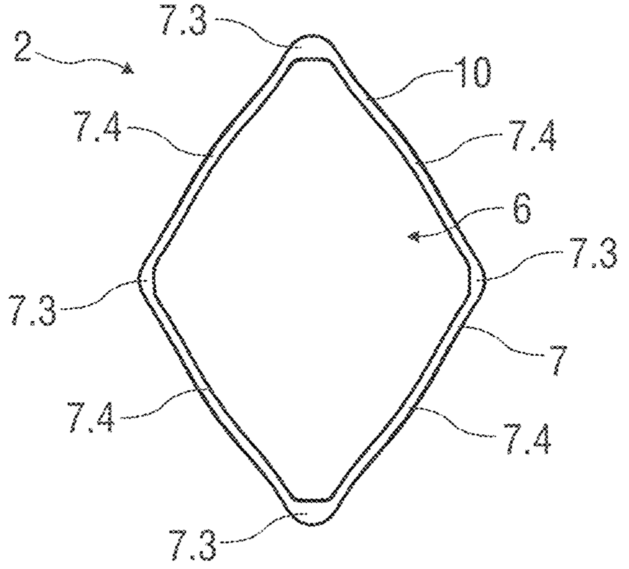
FIG. 17 is a schematic profile cross-sectional view section of the protective element of FIG. 15.
Figure 18:
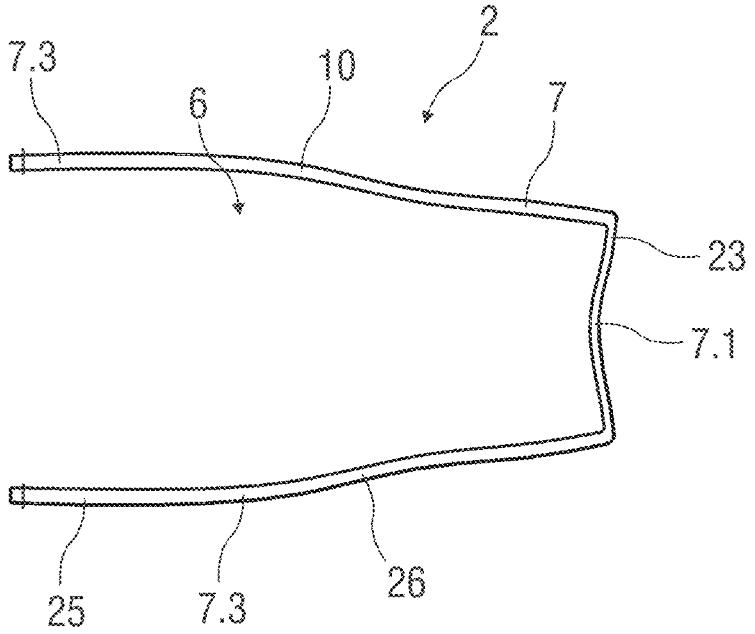
FIG. 18 is a schematic a profile longitudinal sectional view section of the protective element of FIG. 15.

Another exemplary embodiment of the protective element 2 is schematically illustrated in FIG. 15 in a perspective view, in FIG. 16 in a longitudinal sectional view (along cutting plane XVI shown in FIG. 15), in FIG. 17 in a profile cross-sectional view (along cutting plane XVII shown in FIG. 15), and in FIG. 18 in a profile longitudinal sectional view (along cutting plane XVI shown in FIG. 15).

The membrane 7 comprises a plurality of thinner portions 7.1, 7.4 angled relative to one another, in particular at an angle smaller than 180°. E.g., the thinner portions 7.1, 7.4 may be associated with a respective virtual plane extending through a perimeter of the thinner portion 7.1, 7.4, wherein respective normal vectors of the planes are angled relative to one another. Each of the thinner portions 7.1, 7.4 can thus be configured to vibrate in a different direction, e.g., in the direction of the normal vector, in order to transmit sound. In this way, an effective area of the membrane 7, which is predominantly configured for sound transmission, can be effectively increased, e.g., within a restricted space such as inside an ear canal, for instance as compared to a single flat-shaped membrane. E.g., the membrane 7 may include at least part of the thinner portions 7.1, 7.4 in a polyhedric arrangement. An angle at which the thinner portions 7.1, 7.4 are angled relative to one another may be defined as an angle in between the respective virtual planes extending through the perimeter of the thinner portions 7.1, 7.4.

The front wall 9 at a front end 23 of the membrane 7 is formed by the thinner portion 7.1. The front end 23 is opposing a rear end 24 of the membrane 7 at which the opening 8 is provided. The lateral wall 10 extends between the front wall 9 at the front end and the opening 8 at the rear end 24. The lateral wall 10 comprises a plurality of the thinner portions 7.4 surrounding the cavity 6, e.g., as illustrated, four thinner portions 7.4. The front wall 9 and the lateral wall 10 comprise an inner surface delimiting the cavity 6 and an outer surface opposing the inner surface. The outer surface of the lateral wall 10 may define a lateral area of the membrane 7. The outer surface of the front wall 9 may define a bottom of the membrane 7. As illustrated, the membrane 7 may have a cup-like or beaker-like shape with a bottom provided at the front wall 9 and a lateral area provided at the lateral wall 10.

A central axis 22 extends through the cavity 6 surrounded by the lateral wall 10 between the front end 23 of the membrane 7, at which the front wall 9 is provided, and a rear end 24 of the membrane 7, at which the opening 8 is provided, in particular between a center of the opening 8 and a center of the front wall 9. Cutting plane XVI extends through the central axis 22. The central axis 22 is normal to cutting plane XVII.

The lateral wall 10 further comprises thicker portions 7.2, 7.3. At least part of the thicker portions 7.2, 7.3 protrude from at least part of the thinner portions 7.4 at the inner surface of the lateral wall 10. In other examples, as described above, lateral wall 10 may also comprise thicker portions 7.2, 7.3 protruding from at least part of the thinner portions 7.4 at the outer surface of the lateral wall 10. The thicker portion 7.2 of the lateral wall 10 extends around a circumference of the lateral wall 10 and leads to the opening 8 at the rear end 24. The membrane 7 can thus be configured to be attached to the transducer 1 or sound tube 3 at the opening 8 by means of the thicker portion 7.2. The dome 13, which is integrally formed with the membrane 7, is attached to the thicker portion 7.2 at a distance from the rear end 24.

A plurality of the thicker portions 7.3 of the lateral wall 10 extend between two thinner portions 7.4, respectively. The thicker portions 7.3 form stiffeners of the membrane 7 by means of which a stiffness of the membrane 7 can be increased between the thinner portions 7.1, 7.4 due to the larger rigidity of the stiffener 7.3. The stiffeners 7.3 extend in parallel to the central axis 22 in the form of fins 7.3. The thicker portion 7.2 leading to the opening 8 is thicker than the stiffeners 7.3 to account for an increased stability required for the attachment to the transducer 1 or sound tube 3.

As illustrated in FIG. 17, the stiffeners 7.3 protrude from the thinner portions 7.4 at a region of the lateral wall 10 at which two respective thinner portions 7.4 are joined at an angle. The region of the lateral wall 10 at which the two thinner portions 7.4 are joined at the angle may constitute a corner region of the lateral wall 10, as illustrated. The stiffeners 7.3 can then be formed in at least part of the corner regions of the lateral wall 10. As further illustrated in FIG. 17, the thickness of the membrane 7 progressively decreases at the thicker portions 7.3 toward the adjoining thinner portions 7.4, in particular in a direction in which the thicker portions 7.3 lead to adjoining thinner portions 7.4. In some examples, also a thickness of the thinner portions 7.1, 7.4 may vary. E.g., the thinner portions 7.1, 7.4 may become thicker toward the thicker portions 7.3. In this way, a smooth transition between the thinner portions 7.1, 7.4 and thicker portions 7.2, 7.3 may be provided for.

As illustrated in FIGS. 17 and 18, the thinner portions 7.1, 7.4 have a curved shape. In particular, the thinner portion 7.1 at the front end 23 comprises an inward curvature toward the cavity 6. The thinner portions 7.4 of the lateral wall 10 comprise an outward curvature away from the cavity 6. In this way, an effective area of the membrane 7 can be further increased.

As illustrated in FIGS. 16 and 18, the lateral wall 10 comprises a cylindrical section 25 in which a cross section of the lateral wall 10 remains constant, e.g., with regard to the direction of extension along the central axis 22. The lateral wall 10 further comprises a conical section 26 in which a cross section of the lateral wall 10 continuously decreases toward the front end 23. The conical section 26 may facilitate insertion of the protective element 2 into an ear canal and/or provide for an increased stability of the membrane 7 at a portion of the membrane 7 which is more distant from the attachment to the transducer 1 or sound tube 3.

As illustrated in FIG. 15, an angle spanned between the thinner portion 7.1 at the front end 23 and the thinner portions 7.4 of the lateral wall 10 is at least 90°. As illustrated in FIG. 17, an angle spanned between two neighbouring thinner portions 7.4 of the lateral wall 10 is smaller than 150°. In particular, the angle spanned between some of the thinner portions 7.4, as illustrated at the top and bottom of FIG. 17, is smaller than 90°, and the angle spanned between some of the thinner portions 7.4, as illustrated at the left and right of FIG. 17, is larger than 90°.

As illustrated in FIG. 17, the lateral wall 10 has a cross section approximating a polygon with edges joined at corners, wherein the corners are formed by thicker portions 7.3 and the edges comprise the thinner portions 7.4. In particular, the lateral wall 10 has a cross section approximating a rhombus with four corners formed by the respective stiffeners 7.3. A diameter of the lateral wall 10 across two opposing ones of the corners 7.3 is greater than a diameter of the lateral wall 10 across the two other opposing corners 7.3. In the illustrated example, the edges between the corners 7.3, as formed by the thinner portions 7.4, are slightly convex.

Figure 19:
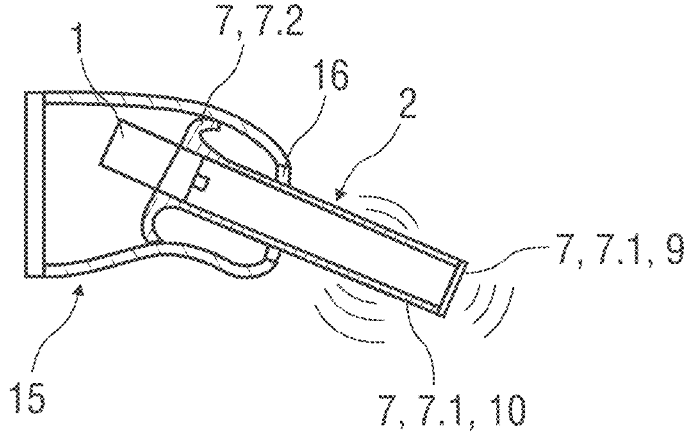
FIG. 19 is a schematic view of a shell or housing of an earpiece configured to be inserted into an ear of a user.

FIG. 19 is a schematic view of a shell 15 or housing of an earpiece configured to be inserted into an ear of a user. The transducer 1 is at least partially mounted within the protective element 2 and the protective element 2 is mounted within the shell 15 and protrudes through a medial end of the shell 15. The medial opening 16 of the shell 15 is significantly wider than the protective element 2. Thus, the protective element 2 emits sound through the thinner portions 7.1 at the front wall 9 or front end and through the thinner portions 7.1 in the lateral wall 10 that protrude from the shell 15 and those that are within the shell 15.

Figure 20:
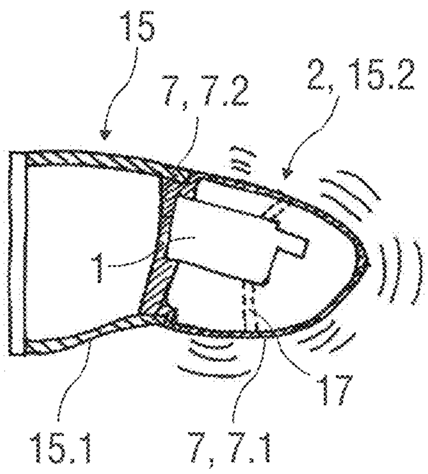
FIG. 20 is a schematic view of another embodiment of a shell or housing of an earpiece configured to be inserted into an ear of a user.

FIG. 20 is a schematic view of a shell 15 or housing of an earpiece configured to be inserted into an ear of a user. The shell 15 comprises a first part 15.1 and a second part 15.2 attached to the first part 15.1 at a medial end thereof. The second part 15.2 is formed as a protective element 2, with thinner portions 7.1 being predominantly employed to transmit sound and thicker portions 7.2 being predominantly used to connect to the first part 15.1. The transducer 1 is at least partially mounted within the protective element 2. Optionally, support structures 17 may be arranged within the protective element 2 to suspend the transducer 1. The first part 15.1 may be configured to contain an energy source such as a battery and electronic circuitry. Moreover, the first part 15.1 may have a shape customized to the user's ear. The second part 15.2 or protective element 2 may be a standard element, e.g. out of a number of two, three, four or more different shapes. The shape of the second part 15.2 or protective element 2 may be determined based on ear space data indicative of an ear canal shape of a plurality of users such that the second part 15.2 is configured to conform to an average ear canal shape as derived from the ear space data. For example, the shape of the second part 15.2 may be selected such that the second part 15.2 contacts the average ear canal along a circumference of the ear canal when inserted. For example, the ear space data may be derived from ear impressions taken from the plurality of users. The second part 15.2 may be made of a flexible material and may be configured to entirely enclose the transducer 1 and keep it separate from the first part 15.1.

Figure 21:
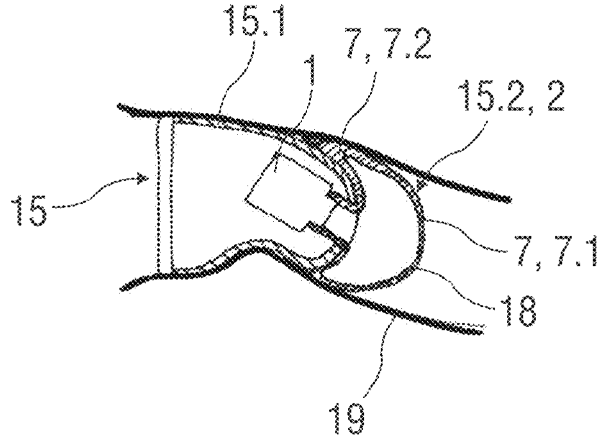
FIG. 21 is a schematic view of another embodiment of a shell or housing of an earpiece configured to be inserted into an ear of a user.

FIG. 21 is a schematic view of a shell 15 or housing of an earpiece configured to be inserted into an ear of a user. The shell 15 comprises a first part 15.1 and a second part 15.2 attached to the first part 15.1 over a medial end thereof. The second part 15.2 is formed as a protective element 2, with thinner portions 7.1 being predominantly employed to transmit sound and thicker portions 7.2 being predominantly used to connect to the first part 15.1 and to the transducer 1. The transducer 1 is mounted within the first part 15.1. The first part 15.1 may be configured to contain an energy source such as a battery and electronic circuitry. Moreover, the first part 15.1 may have a shape customized to the user's ear. The second part 15.2 or protective element 2 may be a standard element, e.g. out of a number of two, three, four or more different shapes. The shape of the second part 15.2 or protective element 2 may be determined based on ear space data indicative of an ear canal shape of a plurality of users such that the second part 15.2 is configured to conform to an average ear canal shape as derived from the ear space data. For example, the shape of the second part 15.2 may be selected such that the second part 15.2 contacts the average ear canal along a circumference of the ear canal when inserted. For example, the ear space data may be derived from ear impressions taken from the plurality of users. The second part 15.2 may be made of a flexible material. A click-on interface may be arranged to releasably attach the second part 15.2 to the first part 15.1.

Figure 22:
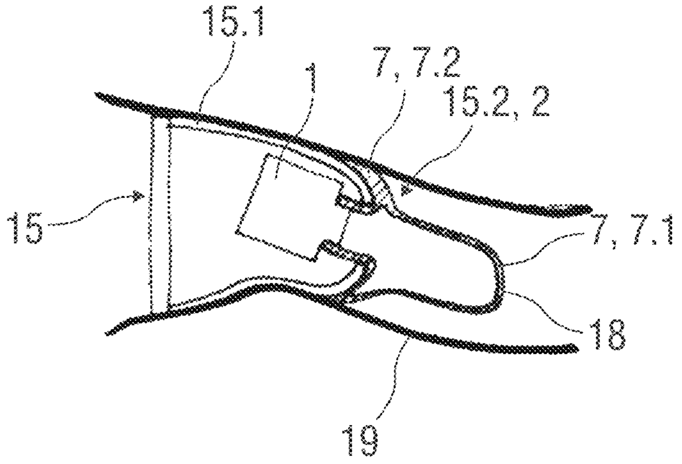
FIG. 22 is a schematic view of another embodiment of a shell or housing of an earpiece configured to be inserted into an ear of a user.

FIG. 22 is a schematic view of a shell 15 or housing of an earpiece configured to be inserted into an ear of a user, similar to the one of FIG. 21. While in FIG. 21 the second part 15.2 comprises a dome shape 18 for radiating sound partially in touch with the ear canal wall 19, the dome shape 18 for radiating sound in FIG. 22 extends from the thicker portion 7.2 so as to be radially spaced from the ear canal wall 19 thus providing an improved radiating surface area.

Figure 23:
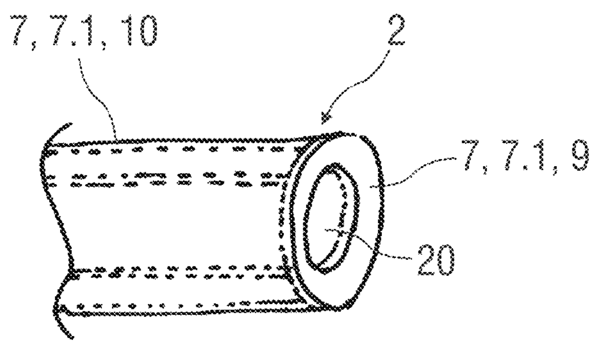
FIG. 23 is a schematic view of a medial end of an exemplary embodiment of the membrane.
Figure 24:
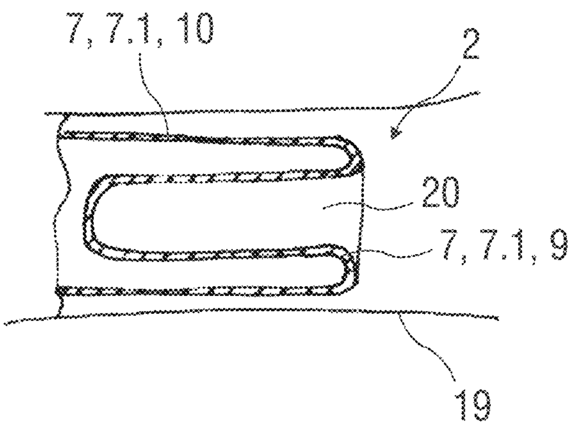
FIG. 24 is a schematic cross sectional view of the membrane of FIG. 23.

FIG. 23 is a schematic view of a medial end of an exemplary embodiment of the protective element 2. FIG. 24 is a schematic cross sectional view of the protective element 2 of FIG. 23. In this embodiment, the protective element 2 comprises an inversion 20 in the bottom 9 or front end, thus increasing the radiation surface area and the bending stiffness.

Figure 25:
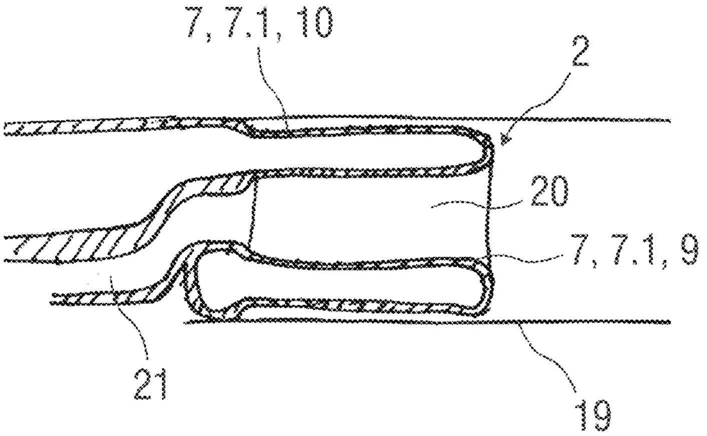
FIG. 25 is a schematic view of a variant of the embodiment of FIG. 23.

FIG. 25 is a variant of the embodiment of FIG. 23, in which a vent 21 is integrated into the protective element 2, wherein a channel of the vent 21 opens out into the inversion 20.

Generally, the protective element 2 is a three-dimensional membrane that features different functional elements. The protective element 2 is completely closed but for the opening 8 and therefore seals the transducer 1 and prevents any substances from entering. The protective element 2 consists of several elements, thinner portions 7.1 that contribute to the acoustic functionality, thicker portions 7.2 that provide mechanical stability and ergonomic parts such as the rounded structure 12 that ensure good wearing comfort. The geometry of the acoustically relevant elements is optimized to improve the acoustic performance in the relevant frequency band and optimized for the transducer type. The protection system is mechanically robust such that it can easily be cleaned without the risk of damage. Example materials are silicone rubbers and other compliant polymers with Young's modulus less than 10 MPa, wall thickness below 0.5 mm and biocompatibility. The features described herein may be applied to other electroacoustic transducers and sensors in general.

It may be possible to generate the functionality of the 3D-shaped protective element 2 by using several different components, e.g. a stiff (metal and/or polymer) housing and multiple acoustically active (e.g. flat) membranes. It may also be possible to integrate the 3D-shaped protective element 2 in a dome 13 or in other receiver housing components.

The present features may improve the user experience of hearing devices or hearing instruments by:

- significantly less cases of transducer malfunctioning,
- less servicing requirement,
- less annoyance for customer,
- reduced cleaning effort compared to conventional wax filters,
- being more suitable for hearing instrument users with reduced dexterity,
- eliminating the need to supply replacement wax filters, and
- yielding a gain in output in the relevant frequency band.

LIST OF REFERENCES

1 electroacoustic transducer, receiver
1LC, 1LN, 1MC, 1MN, 1SC, 1SN curve
2 protective element
3 sound tube
4 recess
5 protrusion
6 cavity
7 membrane
7.1 thinner portion
7.2 thicker portion
7.3 thicker portion, stiffener
7.4 thinner portion
8 opening
9 front wall
10 lateral wall
11 reinforcement part
12 rounded structure
13 dome
14 further dome
15 shell
15.1 first part
15.2 second part
16 medial opening
17 support structure
18 dome shape
19 ear canal wall
20 inversion
22 central axis
23 front end
24 rear end
25 cylindrical section
26 conical section
f frequency
M magnitude
P phase

What is claimed is:

1. A protective element configured to be connected to an electroacoustic transducer or a sound tube included in a hearing device, the protective element comprising:

a 3D-shaped membrane enclosing a cavity with an opening at which the 3D-shaped membrane is configured to connect to the electroacoustic transducer or the sound tube, wherein:

the 3D-shaped membrane has two or more first portions having a first thickness that are configured to transmit sound and two or more second portions having a second thickness;

the first thickness is less than the second thickness such that a rigidity of the 3D-shaped membrane is greater at the two or more second portions than at the two or more first portions; and at least two of the two or more second portions are spaced from one another along a circumference of the 3D-shaped membrane by at least one of the two or more first portions.

2. The protective element of claim 1, wherein the first thickness of the two or more first portions is less than 0.2 mm.

3. The protective element according to claim 1, wherein:

at least two of the two or more first portions are angled relative to one another.

4. The protective element according to claim 1, wherein the 3D-shaped membrane comprises a front wall at a front end opposing a rear end at which the opening is provided, and a lateral wall extending between the front wall and the opening, wherein the lateral wall comprises at least one of the two or more second portions.

5. The protective element of claim 4, wherein the lateral wall comprises at least one of the two or more first portions.

6. The protective element according to claim 4, wherein at least one of the two or more second portions of the lateral wall leads to the opening.

7. The protective element according to claim 1, wherein the two or more second portions extend between the two or more first portions on at least one of an outside or on an inside of the 3D-shaped membrane.

8. The protective element according to claim 1, wherein the 3D-shaped membrane has a cross section approximating a polygon with edges joined at corners, wherein the corners are formed by at least part of the two or more second portions and the edges comprise at least part of the two or more first portions.

9. The protective element according to claim 1, wherein the 3D-shaped membrane is formed by injection molding.

10. The protective element according to claim 1, wherein one or more reinforcement parts made out of a different material than the 3D-shaped membrane are arranged on at least one of an outside or on an inside of the 3D-shaped membrane.

11. The protective element according to claim 1, wherein at least one reinforcement part made out of a different material than the 3D-shaped membrane is arranged within the cavity to internally support the 3D-shaped membrane.

12. The protective element according to claim 1, wherein the two or more first portions constitute a surface of the 3D-shaped membrane of at least 30 $mm^2$.

13. The protective element according to claim 1, further comprising at least one dome configured for sealing against an ear canal, wherein the at least one dome is integrally formed with the 3D-shaped membrane.

14. A hearing device comprising:

at least one of an electroacoustic transducer or a sound tube; and the protective element according to claim 1, wherein the 3D-shaped membrane is connected to the electroacoustic transducer or the sound tube.

* * * * *